United States Patent [19]

Periou et al.

[11] Patent Number: 4,854,183
[45] Date of Patent: Aug. 8, 1989

[54] CYCLIC ELECTROMECHANICAL PROGRAM CONTROL FOR CONTROLLING ELEMENTS, SUCH AS FOR EXAMPLE OPENABLE ROOFS OF VEHICLES

[75] Inventors: Pierre Periou, Cergy Pontoise; Michel Boilley, Paris, both of France

[73] Assignee: Rockwell-CIM, France

[21] Appl. No.: 243,399

[22] Filed: Sep. 9, 1988

[30] Foreign Application Priority Data

Sep. 15, 1987 [FR] France ............................ 87 12774

[51] Int. Cl.⁴ .................... F16H 27/10; F16H 55/12; B60J 7/057
[52] U.S. Cl. ....................................... 74/113; 74/435; 296/223
[58] Field of Search ............. 74/113, 435, 436, 337.5; 49/30, 43, 138; 296/223

[56] References Cited

U.S. PATENT DOCUMENTS

| | | | |
|---|---|---|---|
| 326,984 | 9/1885 | Hooton | 74/435 |
| 831,974 | 9/1906 | Müller | 74/435 |
| 4,311,059 | 1/1982 | Wagle | 74/436 X |
| 4,420,185 | 12/1983 | Bienert et al. | 296/223 |
| 4,468,063 | 8/1984 | Yukimoto et al. | 296/223 |
| 4,659,141 | 4/1987 | Masuda et al. | 296/223 |
| 4,785,362 | 11/1988 | Nozawa et al. | 74/435 X |

Primary Examiner—Leslie A. Braun
Assistant Examiner—Janice E. Chartoff

[57] ABSTRACT

The cyclic electromechanical program control comprises an electric motor (6), a gear train (7) driven by the motor and having an impulse gear (26) and an output gear (5) which is engaged with at least one driving rack (3, 4) for an element (1) having a programmable shifting cycle, a driven gear (9) cooperative with the gear train (7) for receiving from the gear train impulses controlling the cycle of the programmable element (1), an electrical circuit (12, 13, 17, 18) associated with the driven gear (9) and adapted to transmit to the motor (6) instructions corresponding to the nature of the impulses received by the driven gear (9). The control further comprises a mechanism for causing th impulse gear (26) to deliver impulses solely in predetermined useful zones of the cycle of said programmable element (1). The gear train (7) is a differential gear train comprising a driving gear (25) without gearing down of the output gear (5). The program control only delivers driving impulses in useful zones of the cycle and with a precision much higher than that of known program controls.

11 Claims, 6 Drawing Sheets

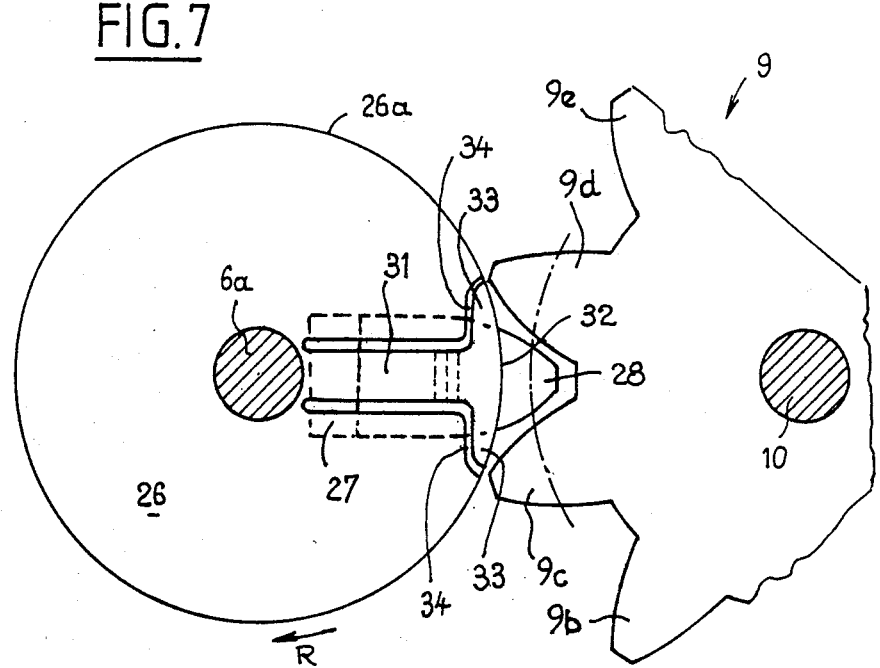
FIG. 7
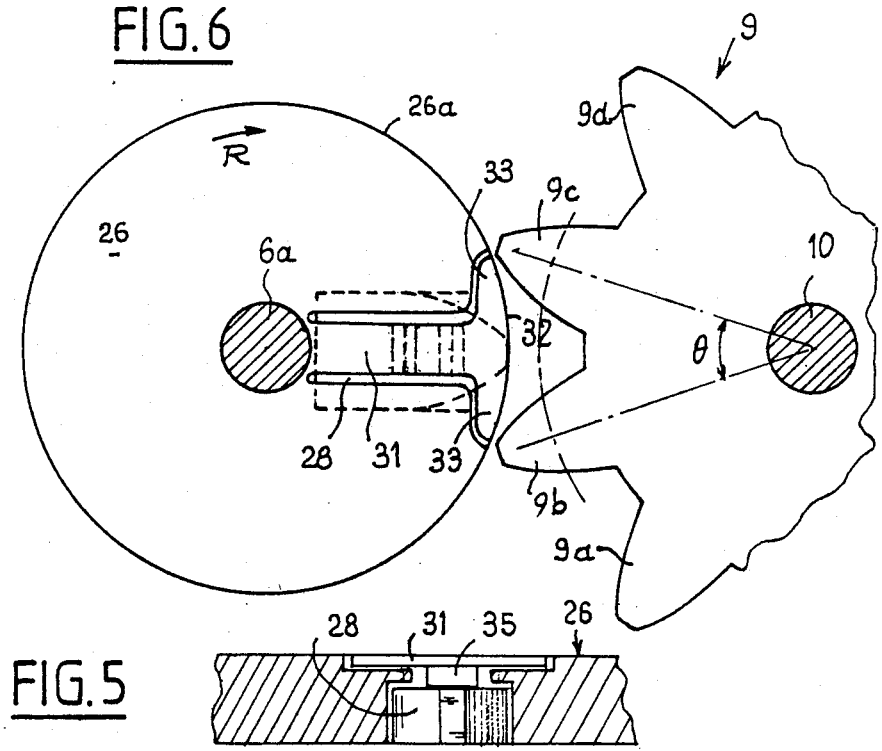
FIG. 6
FIG. 5

FIG. 9
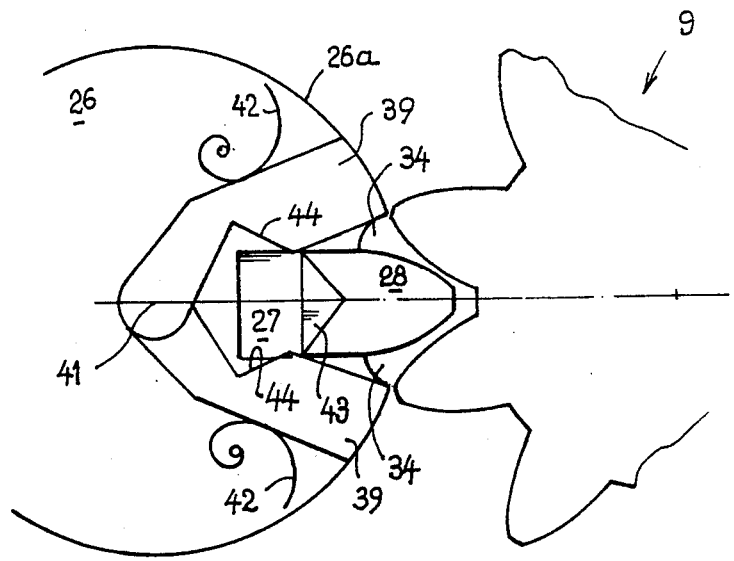
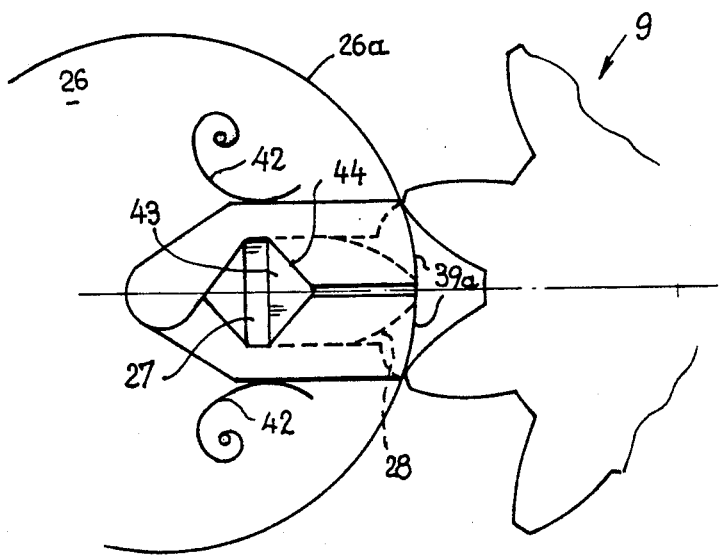
FIG. 8

CYCLIC ELECTROMECHANICAL PROGRAM CONTROL FOR CONTROLLING ELEMENTS, SUCH AS FOR EXAMPLE OPENABLE ROOFS OF VEHICLES

The present invention relates to a cyclic electromechanical program control of the type comprising an electric motor, a gear train having an impulse gear driven by the motor and an output gear which is engaged with at least one driving means of an element having a programmable shifting cycle, a driven gear cooperative with the gear train for receiving from the latter impulses for controlling the programmable cycle of said element, an electrical circuit associated with the driven gear and adapted to transmit to the motor instructions corresponding to the nature of the impulses received by the driven gear.

Such a program control may be employed in many applications, in particular in motor vehicles for controlling accessories such as openable roofs.

BACKGROUND OF THE INVENTION

A program control is known for controlling an openable roof mechanically connected to two rack cables driven by the output gear, the three stop positions of the motor being obtained by means of electrical switches controlled by a cam wheel. As this cam wheel must effect less than one revolution per shifting cycle, a reducing gear train (on the order of 1/20) is provided between the output gear and the cam wheel.

This device is heavy and requires many switches. Moreover, it lacks precision: this is constant throughout the cycle, but insufficient at certain points and useless in certain regions where nothing occurs. Thus, the lack of precision of the stop positions of the openable roof, above all its closed position, results in leakages, noise due to the turbulence of the air, and entry of rain water into the vehicle. For example, the uncertainty in the position of openable roofs equipped with known program controls is about 4 mm.

SUMMARY OF THE INVENTION

An object of the invention is therefore to provide a program control of the aforementioned type whose precision is considerably improved in the zones of the cycle in which events occur, for example, if it concerns an openable roof, its completely open, completely closed and partly opened positions achieved by sliding or tilting.

According to the invention, the differential gear train is provided with means for delivering by the impulse gear impulses solely in predetermined useful zones of the cycle of the programmable element, and the gear train is a differential train arranged without gearing down between its impulse gear and its output gear.

Thus, the control impulses are only delivered to the programmed element in the zones of interest and with a precision greatly superior than heretofore.

According to an embodiment of the invention, the impulse gear contains at least one tooth which is radially movable between a position in which it is completely retracted within said gear pinion and a position in which it projects radially from said pinion and may engage with the driven gear and rotate the latter through a given angle, and the control gear is a cam wheel in which is provided a cam for guiding the displacements of the impulse tooth.

Owing to suitable means provided in the differential train, the impulse tooth moves out of the impulse gear at predetermined moments of the cycle and drives the driven gear which controls, through a suitable electrical circuit, the stoppage of the driving motor of the differential train so as to stop the element driven by this train.

The position of the element driven by the differential train is therefore obtained with no gearing down between the gear controlling the differential train and the output gear of the latter, these two gears being indeed mounted on the same shaft, in contrast to prior program controls. The corresponding angular precision is consequently very much higher than that obtained before, for example a precision of 1° instead of 20° with a corresponding increase in precision in respect of the linear position of the controlled element.

Further features and advantages of the invention will be apparent from the following description, with reference to the accompanying drawings, which illustrate several non-limitative embodiments of the invention by way of example.

BRIEF DESCRIPTION OF THE DRAWINGS

FIG. 5 is a side elevational view of the impulse gear and its tooth in the differential gear train of FIGS. 1 to 3;

FIG. 6 is a top plan view of the cam gear and the driven gear of the program control of FIGS. 1 to 5, in the position in which it is blocked in rotation, the impulse tooth being retracted within the gear;

FIG. 7 is a view similar to FIG. 6 of the impulse tooth projecting from the gear and in a position for engaging with the driven gear;

FIGS. 8 and 9 are top plan views similar to FIGS. 6 and 7 respectively, of a second embodiment of the program control according to the invention;

DESCRIPTION OF THE PREFERRED EMBODIMENTS

The device shown in FIGS. 1 to 7 is a cyclic electromechanical program control for controlling the displacements of an element in accordance with a predetermined cycle.

Figure 12:
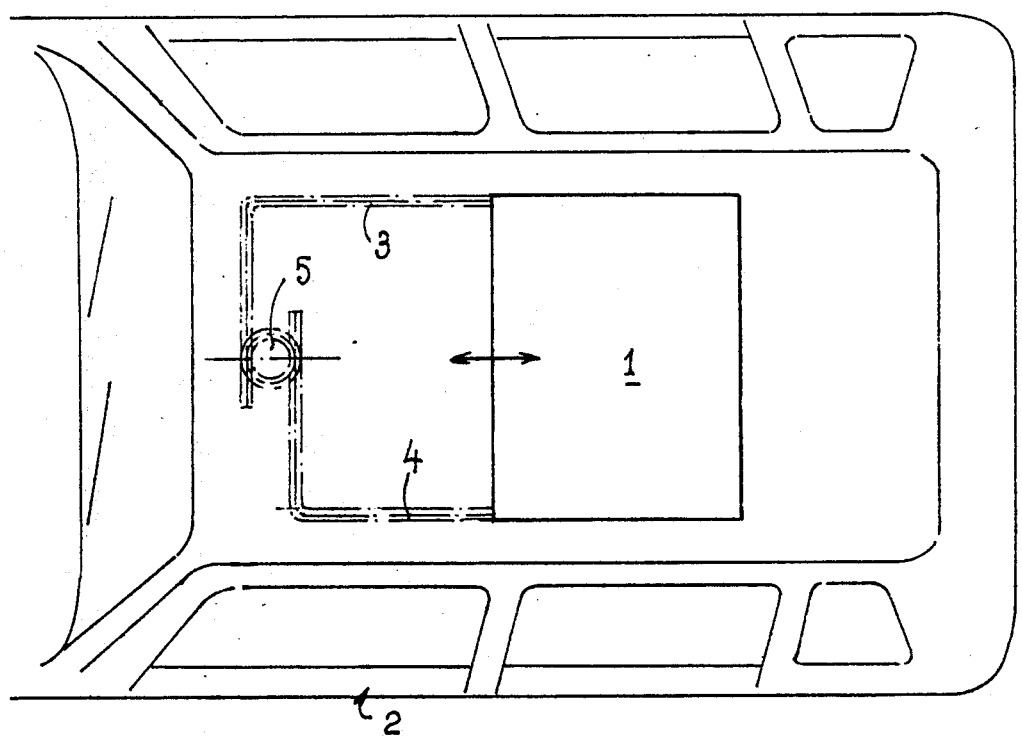
FIG. 12 is a simplified top plan view of a motor vehicle provided with an openable roof which may be controlled by a program control according to the invention.

This element may be for example an openable roof 1 of a vehicle 2 (FIG. 12) which is longitudinally slidable in an opening in the roof of the vehicle by means of flexible driving rack cables 3, 4 which are driven by an output gear 5 of the program control. The roof 1 may also be pivotable to the open position by known means (not shown).

The program control of FIGS. 1 to 7 comprises an electric motor-speed reducer unit 6, a differential gear train 7 mounted on the output shaft 6a of the motor-speed reducer unit 6 coaxially with the latter, this differential gear train 7 terminating in a gear wheel 5, a driven gear wheel 9 having a shaft 10 being cooperative with the gear train 7, electrically conductive brushes 11 fixed to the gear wheel 9 with which they form a switch, and fixed circular electrical tracks 12, 13, 17 on which the ends of the brushes 11, 14 rub. The tracks have interruptions or gaps such as 15, 16 in given zones and are connected to an electrical control box 18 through connections 19, the box 18 being electrically connected to, on one hand, the motor-speed reducer 6 through connections 21 and, on the other hand, to a source of DC current through two connections 22, 23. The tracks 12, 13, 17 carry small currents which control relays placed in the control box 18. When the switch constituted by the gear 9 and the associated brushes rotates through a given angle, this rotation may cause an electrical change in the tracks, such as the absence of current, reversal of current, etc., which modifies the operation of the motor 6, by the stoppage or change in speed, etc.. of the motor.

The gear train 7 comprises, in succession, mounted on the output shaft 6a, a gear 24 rigid with the shaft 6, a gear 25 freely rotatable on the shaft 6a, an impulse gear 26 rigid with the shaft 6a, and then the output gear 5. A gear 8 is in mesh with the gear 24 and the driving gear 25 so as to transmit to the latter the rotation of the gear 24. The gear 25 drives an output tooth 28 of the gear 26 in predetermined zones of the cycle, as will be explained hereinafter, and means are also provided for causing the gear 26 to deliver impulses solely in predetermined useful zones of the cycle of the programmable elements driven by the gear 5.

The gears 24, 25, 8 and the impulse gear 26 will now be described in more detail.

The first gear 25 of the gear train 7 which is freely rotatable on the output shaft 6a, is provided with a given number "x" of teeth or a number equal to a multiple of this number "x", this gear constituting the cam wheel 25 controlling the impulse tooth 28. The second gear 24 of the gear train 7, rigid with the output shaft 6a of the motor 6, is provided with a number of teeth which exceeds or is less than one unit of the number "x", or equal to the same multiple as the cam wheel 25, which number is increased or decreased by a gearing up or gearing down means M. The latter is equal to the ratio between the number of teeth of the first gear 25 to the number of rotations effectd by the output gear 5 during one complete cycle.

Consequently, the gear 24 has x−1 teeth, for example 24 or a multiple of 24, the gear 25, freely rotatable on the driving shaft 6a, has (X) teeth, namely 25 teeth or a multiple of 25, the gear 8 has any number of teeth Y.

Figure 1:
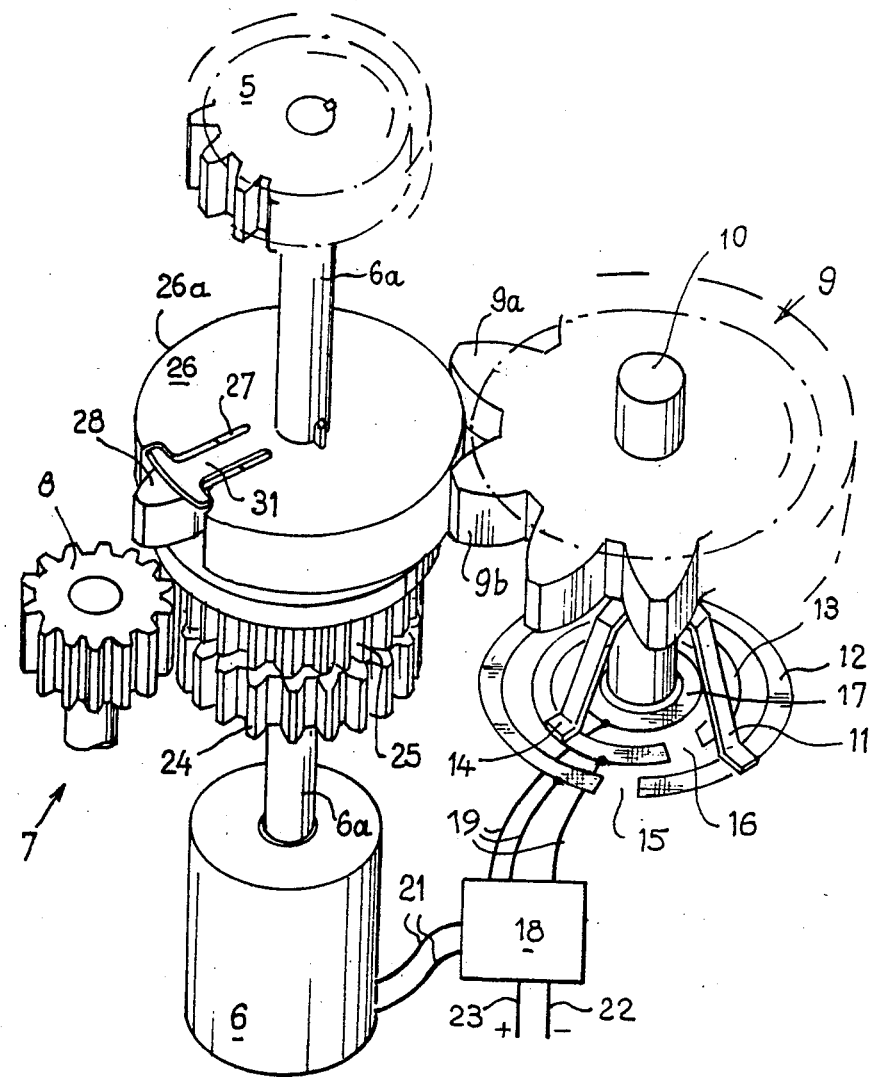
FIG. 1 is a perspective view of a first embodiment of the cyclic electromechanical program control according to the invention.
Figure 4:
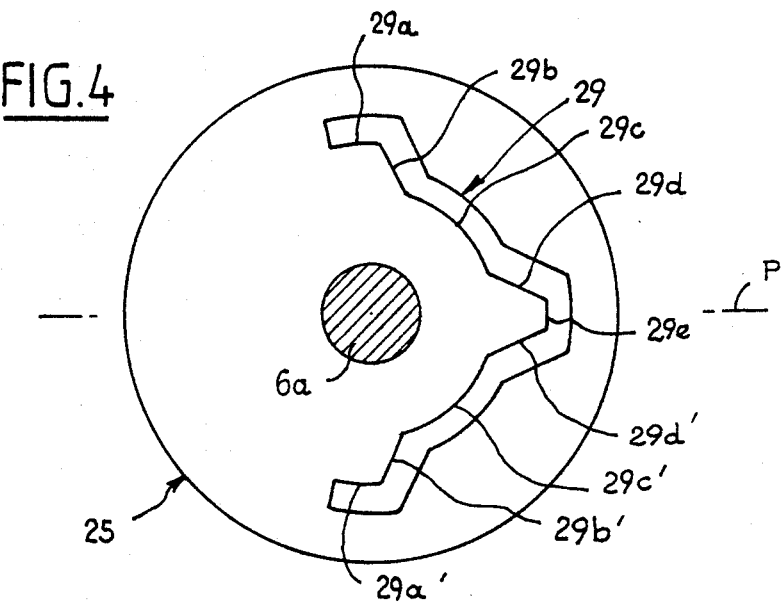
FIG. 4 is a top plan view of a member of the differential gear train constituting the cam wheel controlling the impulse tooth in the differential gear train of the program control of FIGS. 1 to 3.

The wheel 26 is not toothed and its circumference constitutes a locking circle 26a of the teeth 9a, 9b ... of the driven gear 9 which is prevented from rotating by the wheel 26 when its teeth 9a, 9b ... are in contact with the locking circle 26a (FIGS. 1 and 6). Formed in the wheel 26 is a radial cavity 27 in which is radially slidably mounted an impulse tooth 28 which is movable between a position in which it is completely retracted within the wheel 26 and a position in which it radially projects from this wheel and is capable of meshing with the driven gear 9 and rotating the latter through a given angle. The movements of the impulse tooth 28 are guided by a cam 29 formed by a groove in the surface of the gear 25 confronting the wheel 26. Extending into this cam 29 is a lug or pin 30 of the tooth 28 whose radial position is therefore related to that of its guide pin 30 in the cam groove 29. The latter may be formed for example as illustrated in FIG. 4, in which it can be seen that it constitutes a groove which is symmetrical relative to a plane P containing the shaft 6a and perpendicular to the gear 25 on each side of which are provided suitably contoured ramps 29a, 29a', 29b, 29b', 29c, 29c', 29d, 29d'. The latter are connected by a central ramp 29e which is sufficiently close to the periphery of the cam gear 25 to ensure that the tooth 28 projects out of the gear 26 when its pin 30 is located in confronting relation to the ramp 29e. On the other hand, the two intermediate ramps 29c, 29c' correspond to the positions of the tooth 28 in which it is completely retracted within the gear 26. Between the two ramps 29a, 29a', and the central ramp 29e the other ramps may be suitably contoured, for example by providing two rectilinear ramps 29b, 29b' and 29d, 29d', between which two curved ramps 29c, 29c' are formed.

Means are provided by the invention for maintaining the driven gear 9 fixed in rotation while the impulse tooth 28 is completely retracted within the gear 26. These means comprise at least one movable element mechanically connected to the impulse gear 26 and having a periphery which extends over an angular sector substantially greater than that required for the radial projection of the tooth 28, and completing the circumference of the gear 26 when the tooth 28 is completely withdrawn within the gear. This movable element is adapted to be cooperative with the tooth 28 in such manner as to clear the angular sector of passage of the tooth when it moves out of the gear and to occupy this angular sector when the tooth 28 is withdrawn within the gear.

In the embodiment shown in FIGS. 1 to 7, this movable element is a flexible strip 31 which is in one piece with the gear 26 or mounted thereon and bears against the gear 26 and the tooth 28 extending radially above the cavity 27 up to the circumference of the locking circle 26a that its circular outer edge 32 completes. The strip 31 starts in the vicinity of the centre of the gear 26 and, adjacent to the locking circle 26a, its end has two circumferential portions 33 which extend in opposed directions for covering an angular sector defined by the outer edge 32. The latter extends over a sector which is substantially the sum of the sector of passage of the tooth 28 and the two cavities 34 provided on the periphery of the gear 26 on each side of the cavity 27.

The strip 31 is provided with a boss 35 which projects into the cavity 27 and is cooperative with a corresponding boss 36 (FIGS. 2 and 3) formed on the impulse tooth 28 when the latter extends out of the gear 26 or retracts within the latter.

The program control just described operates in the following manner.

At rest, thetooth 28 is retracted within the gear 26 whose locking circle 26a, tangent to the two teeth 9a, 9b of the gear 9, thus prevents from rotating (FIG. 1). When the motor-speed reducer unit 6 is operated, its shaft 6a drives at the same speed the gears 24, 26 and 5. The pin 30 is initially in an intermediate groove 29c or 29c'. Furthermore, the gear 8 driven by the gear 24 drives the freely rotatable cam gear 25 in rotation.

When the gear 24 effects one revolution, the cam gear 25 effects one revolution minus one tooth, and, when the gear 24 effects (X+1) revolutions, the gear 25 effects (X) revolutions, the gears 24 and 25 thus forming a differential mechanism. It may for example be arranged that the output gear 5 effect a maximum of twenty-five revolutions for one cycle, namely X=25. The gear 24 will therefore have twenty-four teeth and the gear 25, twenty-five teeth. At the end of twenty-five revolutions of the gears 24 and 5, the cam gear 25 will therefore have effected twenty-four revolutions and the gears 24, 25 will be put out of phase by one revolution.

More generally, if the output gear 25 must effect twenty-five revolutions during a complete cycle, the gear 25 may have twenty five teeth, and the gear 24 will have twenty-four or twenty-six teeth, the multiplier M being therefore equal to 1 (1×25±1).

If the gear 25 has fifty teeth, the multiplier is equal to 2, and the number of teeth of the gear 24 will be 50±2=48 or 52.

The gear 24 can therefore have X+1 teeth, instead of X−1 teeth and will therefore have effected X+1 revolutions when the gear 25 has effected X revolutions. In both cases, there is obtained a phase shift of one revolution of the gear 25 relative to the gear 24 at the end of 25 revolutions of the latter.

The progressive angular shift in phase between the gears 25 and 24 causes the pin 30 to slide in the cam 29. The pin 30 therefore slides along successive ramps 29c or 29c' to the exterior ramp 29e, the tooth 28 consequently sliding radially inside the gear 26 to a position in which it projects outside the latter. The tooth 28 therefore progressively moves from its retracted position of FIGS. 2 and 6 to its projecting position of FIGS. 3 and 7 while rotating at the same speed as the gear 26.

Figure 3:
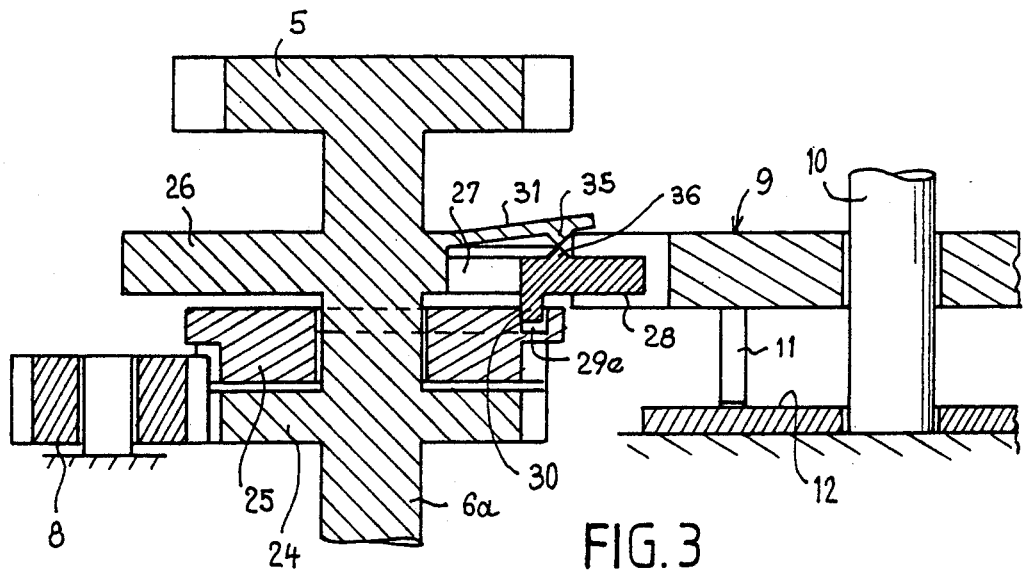
FIG. 3 is a view similar to FIG. 2 of the impulse tooth in its operative position engaged with the driven gear.
Figure 2:
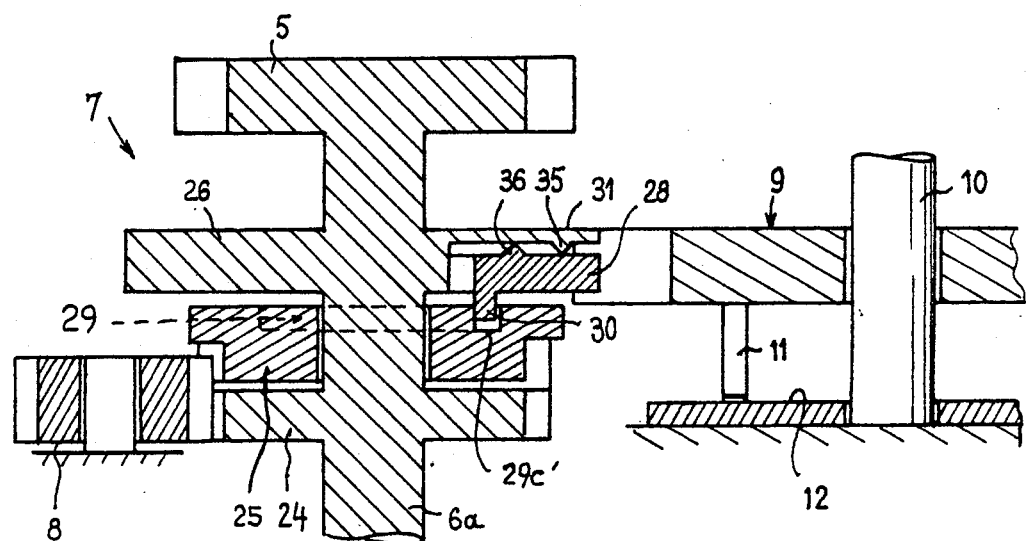
FIG. 2 is a partial sectional view to an enlarged scale of the program control of FIG. 1, with its impulse tooth in its inoperative position.

At the beginning of the radial movement of the tooth 28, its boss 36 is moved away from the boss 35 of the strip 31, whose resilience maintains it. In the plane of the surface of the gear 26, its outer edge 32 completing the circumference of the locking circle 26a. When the tooth 28 has sufficiently moved out of the gear 26, the boss 36 comes into contact with the boss 35 and raises the strip 31 (FIG. 3). The tooth 28 is completely moved out of the gear 26 when its pin 30 is on the ramp 29e. If the gear 26 rotates in the clockwise direction R (FIG. 6), the movable tooth 28 comes to strike against the fixed tooth 9c and is interposed between 9c and 9d (FIG. 7). When the tooth 28 leaves the tooth 9c, the tooth 9d is in the cavity 34 The rotation of the gear 9 is in this way maintained until the tooth 9c leaves the cavity 34, i.e. when the tooth 9d has taken the place of the tooth 9b of FIG. 6. As a result of an impulse given by the tooth 28, the driven gear 9 therefore rotates through an angle 2θ, θ being the angle subtended at the centre between two consecutive teeth of the gear 9 (FIG. 6).

The rotation of the gear 9 drives the brushes 11, 14 along the associated tracks 12, 13 (a brush not seen in FIG. 1 cooperating with the inner track 17), at least one of the brushes being placed on the gap 15 or 16 of the tracks. An instruction is therefore given to the motor-speed reducer unit through the control box 18 for producing a predetermined event in the cycle, for example a passage to low speed or, on the contrary, to a higher speed or an automatic stoppage of the element controlled by the rotation of the output gear 5.

The angular phase shift between the cam gear 25 and the input gear 24 continues after the rotation of the gear 9 through the angle 2θ and the impulse tooth 28 progressively retracts within the gear 26 owing to the radial sliding of its pin 30 along one of the guide ramps 29d, 29d' and 29c, 29c'. During this return of the tooth 28, its boss 36 cooperates with the boss 35 of the strip 31 and the latter resiliently lowers to its initial position.

The meshing of the teeth of the gear 9 with the impulse tooth 28 is rendered possible by the lateral clearance cavities 34 which in fact allow the successive penetration of the teeth 9c and 9b under the outer edge 32 and under the tabs 33 within the circumference of the circle 26a, the access to these clearance cavities 34 being rendered possible by the raising of the strip 31 (FIG. 3). Moreover, the presence of the strip 31 and its edge 32 prevents the entry of the teeth 9b, 9c . . . when the impulse tooth 28 is in its retracted position. The strip 31 in this way constitutes a movable indexing system which completes the locking circle 26a when the tooth 28 is retracted and, on the other hand, opens this circle 26a when the tooth 28 projects out of the gear 26 owing to the action of the two complementary bosses 35, 36.

The contours of the ramps 29c, 29c', 29d, 29d' contiguous to the central ramps 29e are so arranged that the tooth 28 starts to move out of the gear 26 under the action of one of the ramps 29d and 29d' depending on the direction of rotation of the gear 25, a little less than one revolution before imparting the pulse to the gear 9 and retracts in a little less than one revolution after the impulse. This ensures that the tooth 28 does not touch the teeth 9b or 9c in the revolutions preceding or following the impulse. The cam 29 can, for example, (FIG. 4) have four ramps (29b, 29b', 29d, 29d') which each time cause the tooth 28 to project out of the gear 26 for causing predetermined events in the cycle, for example three stoppages of the openable roof 1 (FIG. 12): completely closed position, partly opened position, completely opened position.

The gear 25 may have a plurality of cams such as 29 with which are associated as many respective impulse teeth.

As a numerical example, there may be arranged for an openable roof 1 which is slidable or pivotable about a transverse axis (by means known per se and not shown), the following cycle:

stoppage at the end of the pivoting travel: tooth 28 projecting out of the gear 26, after five revolutions of the output gear 5: roof 1 closed, after twenty revolutions of the output gear 5, the end of the longitudinal travel of the roof (the impulse tooth 28 moving out of and into the gear 26 as mentioned hereinbefore in a little less than one revolution). The cam of the gear 25 has therefore such contour that the angular difference between one of its end ramps and its central ramp corresponding to the projection of the tooth, corresponds to a retracted position of the tooth 28 during four revolutions and that, upon the fifth revolution, the tooth projects out of the gear 26. The same is true of the sliding travel of the aforementioned cycle: the tooth 28 is retracted during nineteen revolutions and projects out of the gear 26 in the course of the twentieth revolution. All of the ramps of the cam of the gear 25 are positioned within less than 360°.

The technical advantages of the program control according to the invention are the following:

Owing to the fact that the interconnected gears 24, 26, 5 are mounted on the same driving shaft 6a, there is no gearing down between the impulse gear 26 and the output gear 5 so that the angular position of the element controlled by the output gear 5 can be obtained with the same precision as that of the angular position of the impulse gear 26. This precision is much higher than that of known prior mechanisms which have a gearing down between the output and the impulse gear. The impulse gear 26 only delivers to the driven gear 9 impulses in the useful zones of the cycle of the element to be controlled in which all the desirable precision may therefore be obtained, while the impulse tooth 28 is retracted in the inoperative zones of the cycle. The precision of the position of the closure of an openable roof of a vehicle may therefore be about 1 mm and this avoids practically all the drawbacks mentioned hereinbefore (noise of the air beyond a certain speed of the vehicle, entry of rain water, etc. . .).

The number of component parts in motion in the differential gear train 7 is reduced to a minimum and this reduces the operational play relative to prior devices.

In a second embodiment of the program control (FIGS. 8 and 9), the means for maintaining the gear 9 fixed in rotation while the impulse tooth 28 is completely retracted within the gear 26 comprise, instead of the movable strip 31 which is in one piece with the gear 26 or mounted on the latter, two movable flaps 39 which are pivotable about a pin 41 which may be common on the gear 26 on each side of the tooth 28 and its cavity 27. The flaps 39 extend radially to the periphery of the gear 26 and are so dimensioned that their outer edges 39a occupy a circular sector of the periphery of the gear 26 (locking circle 26a) equal to the sum of the sector of passage of the tooth 28 (width of the cavity 27) and the cavities 34. Resiliently yieldable means formed by springs 42 whose ends are fixed to the gear 26 return the flaps 39 toward each other to their position in which they close the locking circle 26a (FIG. 8). The tooth 28 and the flaps 39 are provided with complementary means for spreading apart the flaps 39 when the tooth 28 projects out of the gear 26. In the described embodiment, these means comprise a triangular profile 43 fixed in position on the tooth 28 and projecting from the latter in the region of the flaps 39 and two rectilinear ramps 44 provided on the inner edge of the flaps 39 for cooperation of each with one side of the profile 43.

When the tooth 28 is retracted within the gear 26, the ramps 44 bear against the corresponding sides of the profile 43, and their outer edges 39 complete the circumference of the gear 26 and lock the gear 9 in rotation.

When the tooth 28 moves out of the gear 26, the sides of its profile 43 slide along the ramps 44 and spread apart the flaps 39 until the latter have completely cleared the angular sector of the tooth 28 and the cavities 34 (FIG. 9). When the tooth 28 retracts within the gear 26, the springs 42 return the flaps 39 to their closing position.

Figure 11:
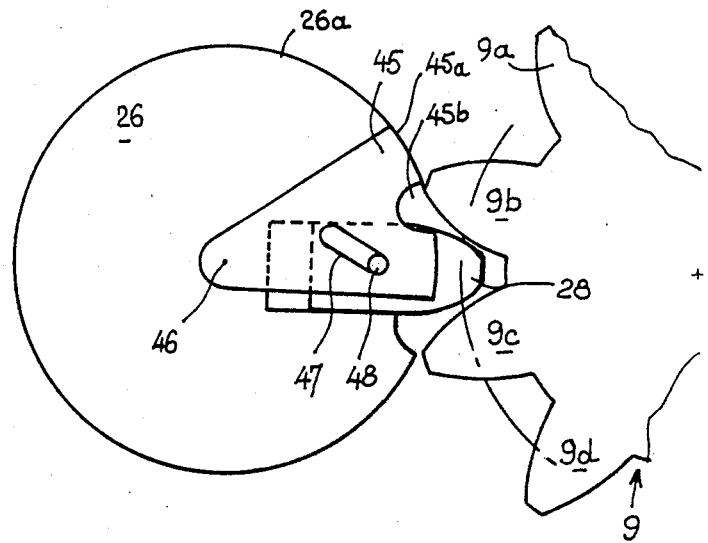
FIGS. 10 and 11 are top plan views respectively similar to FIGS. 6 and 7 of a third embodiment of the program control according to the invention.
Figure 10:
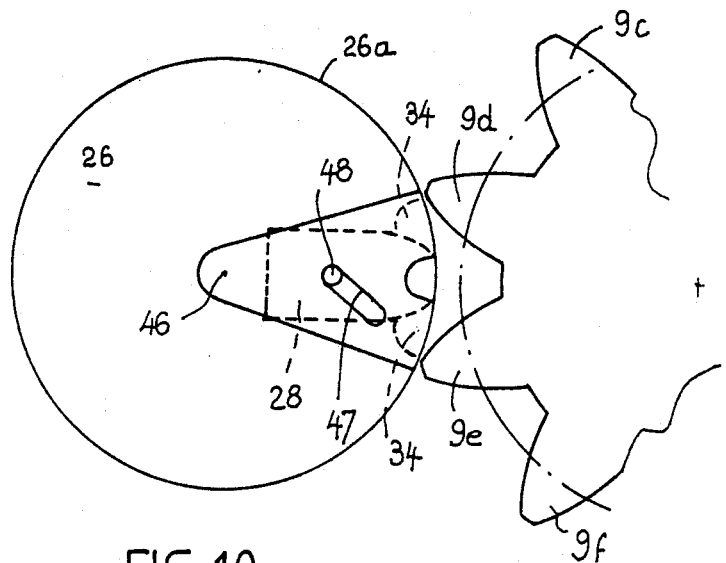

In the third embodiment shown in FIGS. 10 and 11, the means for locking the gear 9 in rotation comprise a radial flap 45 pivotally mounted on the pin 46 of the gear 26 and provided with a direct-drive slot 47 in which a pin 48 rigid with the tooth 28 is slidable. The outer edge 45a of the flap 45 extends in an angular portion of the locking circle 26a equal to the sum of the sector of the passage of the tooth 28 and the cavities 34 so as to completely cover this gap in the locking circle 26a when the tooth 28 is in its retracted position (FIG. 10). A cavity 45b similar to the cavities 34 is provided in the central zone of the outer edge 45a so as to be placed in confronting relation to one of the clearing cavities 34 when the tooth 28 moves out of the gear 26 (FIG. 11).

The slot 47 is so inclined that the radial movement of the pin 48 in the latter causes the flap 45 to rotate about its pin 46. When the tooth 28 is retracted, the notch 45b is superimposed on the tooth 28 so that the locking circle 26a is rendered continuous by the end of the tooth 28. When the tooth 28 starts to move out of the gear 26, its pin 48 causes the flap 45 to rotate until this pin 48 comes to abut against the opposite end of the slot 47, the notch 45d then being superimposed on a cavity 34 to permit the teeth 9b, 9c . . . to engage with the impulse tooth 28.

We claim:

1. An electromechanical cyclic program control for an element shiftable in accordance with a programmable shifting cycle, said control comprising an electric motor, a gear train drivenly connected to the motor and including an impulse gear and an output gear, at least one driving means for said element having a programmable shifting cycle drivenly engaged with said output gear, a driven gear cooperative with said gear train for receiving impulses from said gear train for controlling said programmable cycle of said element, an electrical circuit associated with said driven gear, electrical conductive means connecting the electrical circuit to said motor for transmitting to the motor instructions corresponding to the nature of the impulses received by said driven gear, means for causing said impulse gear to deliver impulses solely in predetermined useful zones of said programmable cycle of said element, said gear train being a differential gear train without a gearing down between said impulse gear and said output gear.

2. A control according to claim 1, wherein said impulse gear has at least one impulse tooth radially movable between a position in which said impulse tooth is completely retracted within said impulse gear and positions in which said impulse tooth radially projects from said impulse gear and is capable of meshing with said driven gear and causing said driven gear to rotate through a given angle, and said means for causing the impulse gear to deliver impulses comprise a driving gear constituting a cam gear having a cam provided in said cam gear for guiding said movements of said impulse tooth.

3. A control according to claim 2, wherein said motor has an output shaft, said differential gear train comprises a first gear freely rotatively mounted on said output shaft and having a given number (X) of teeth or a number of teeth equal to a multiple of said number (X), said driving gear which constitutes said cam gear being operatively connected to said impulse tooth for controlling said movements of said impulse tooth, a second gear rigid with said output shaft and having a number of teeth which is different by one unit from said number (X) or equal to the same multiple as said cam gear, which number is increased or decreased by a multiplier equal to the ratio of the number of teeth of said first gear to the number of rotations of said output gear during one complete cycle, and a gear pinion meshed with and interconnecting said first gear and said second gear for transmitting to said first gear the rotation of said second gear, said second gear, said impulse gear and said output gear rotating at the same speed of rotation.

4. A control according to claim 3, wherein said impulse tooth has a lug and said cam comprises a guide groove receiving said lug of said impulse tooth and defining ramps of such contour that, with said first gear driven by said gear pinion at a speed of rotation slightly different from the speed of rotation of said second gear, said differential speed causes a sliding of said lug in said cam and consequently a movement of said impulse tooth along said ramps in accordance with a law determined by said contour of said ramps, between at least one position in which said impulse tooth is completely retracted within said impulse gear and radially projecting positions of said impulse tooth.

5. A control according to claim 2, comprising means for maintaining said driven gear fixed in rotation while said impulse tooth is completely retracted within said impulse gear.

6. A control according to claim 5, wherein said impulse gear defines an angular sector of passage for the radial projection of said impulse tooth and said means for maintaining said driven gear fixed in rotation comprise at least one movable member mechanically connected to said impulse gear and having a peripheral portion which extends in an angular sector of said impulse gear substantially greater than said angular sector of passage for the radial projection of said impulse tooth and completing the circumference of said impulse gear when said impulse tooth is completely retracted within said impulse gear, said movable member being cooperative with said impulse tooth in such manner as to clear said angular sector of passage for said impulse tooth when said impulse tooth must project from said impulse gear and to occupy said angular sector when said impulse tooth is retracted within said impulse gear.

7. A control according to claim 6, wherein lateral cavities are provided on the periphery of said impulse gear on each side of said angular sector of passage for said impulse tooth so as to permit the engagement of teeth of said driven gear with said impulse tooth, and said movable member extends angularly in a portion of the circumference which is substantially equal to the sum of said angular sector of passage for said impulse tooth and said lateral cavities.

8. A control gear according to claim 7, wherein said impulse tooth has a boss and said movable member is a flexible strip integral with said impulse gear and provided with a boss which is cooperative with said boss on said impulse tooth for raising said strip when said impulse tooth projects out of said impulse gear and for lowering said strip and re-closing the circumference of said impulse gear when said impulse tooth retracts into said impulse gear.

9. A control according to claim 7, wherein said means for maintaining said driven gear fixed in rotation comprise movable flaps which are pivotally mounted on said impulse gear on each side of said impulse tooth, extend radially to the periphery of said impulse gear and occupy a portion of said periphery which is substantially equal to the sum of said angular sector of passage for said impulse tooth and said lateral clearing cavities, and said impulse tooth and said flaps are provided with complementary means for spreading said flaps apart when said impulse tooth projects from said impulse gear, resiliently yieldable means being provided for biasing said flaps to a position in which said flaps close said portion of the periphery of said impulse gear when said impulse tooth is retracted within said impulse gear.

10. A control according to claim 7, wherein said means for maintaining said driven gear fixed in rotation comprise a radial flap which is pivotally mounted on said impulse gear and defines an opening, and a pin rigid with said impulse tooth slidable in said opening, an outer edge of said flap extending in an angular portion of the circumference of said impulse gear equal to the sum of said angular sector of passage for said impulse tooth and said lateral clearing cavities, said opening and said pin being arranged in such manner that the projection of said impulse tooth from said impulse gear causes a rotation of said flap which clears said cavities and that a retraction of said impulse tooth puts said flap back into a position where said flap covers said cavities and completes the circumference of said impulse gear.

11. A control according to claim 10, wherein a notch similar to said cavities of said impulse gear is provided in an outer edge of said flap and so positioned as to place itself in confronting relation to one of said cavities when said impulse tooth projects out of said impulse gear.

* * * * *